June 7, 1955  E. R. DYE  2,709,810
SHOCK ABSORBING MEDIA
Filed Nov. 3, 1951  3 Sheets-Sheet 1
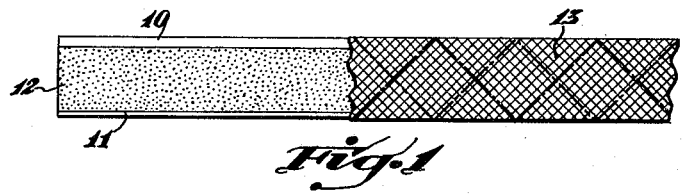
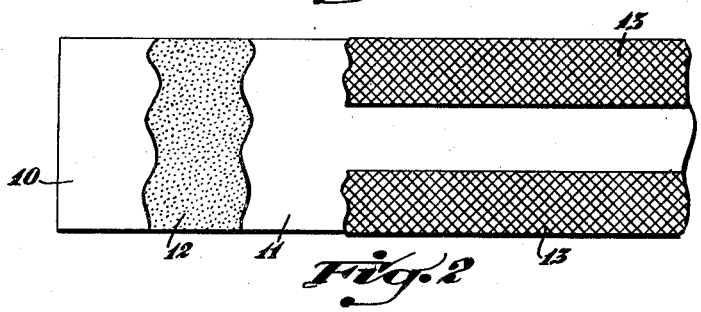
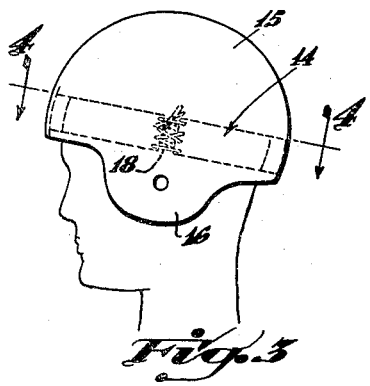
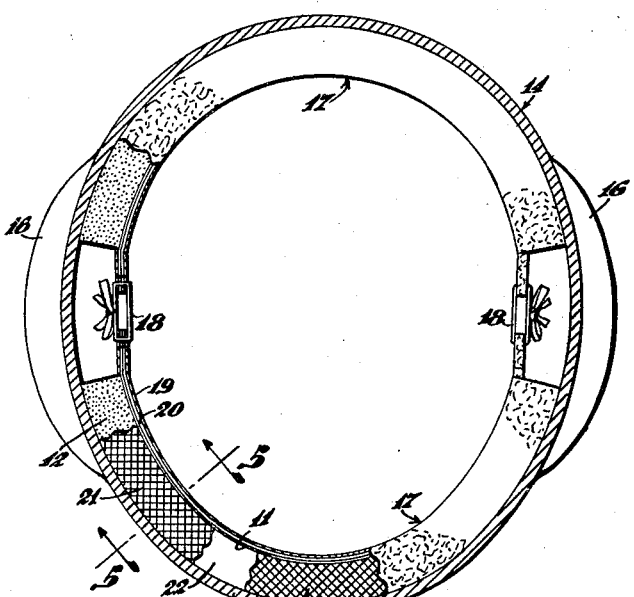
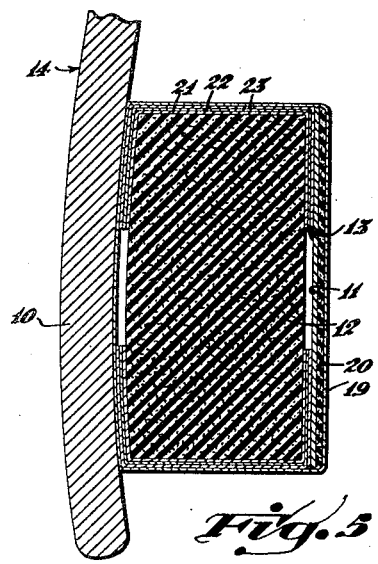
INVENTOR.
BY Edward R. Dye.
Wood, Herron & Evans.
ATTORNEYS.

June 7, 1955   E. R. DYE   2,709,810
SHOCK ABSORBING MEDIA
Filed Nov. 3, 1951   3 Sheets-Sheet 2
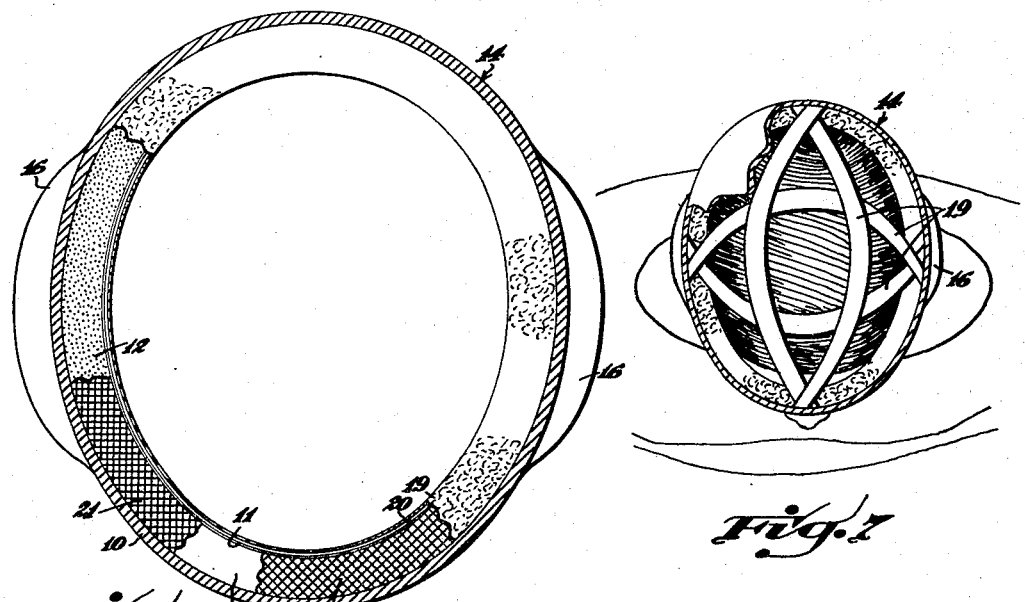
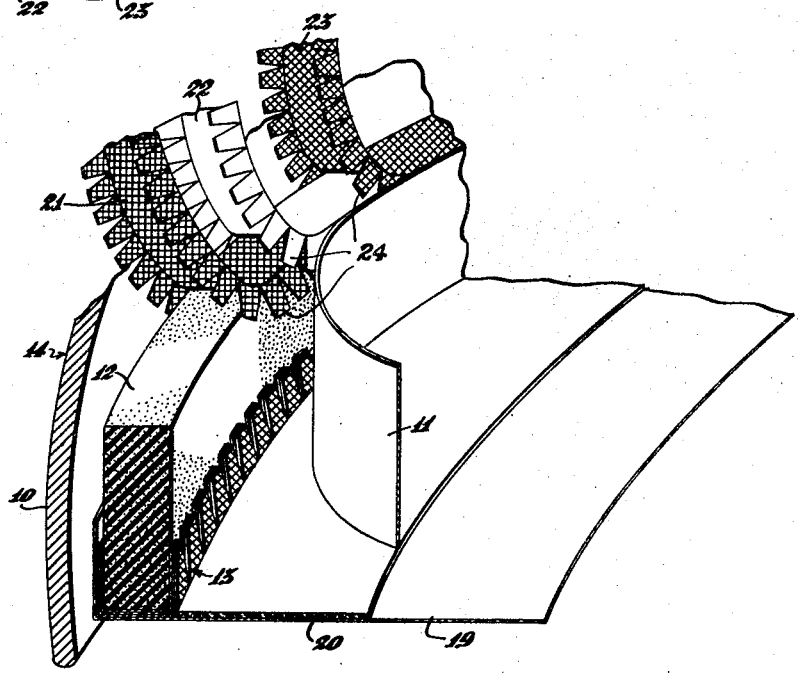
INVENTOR.
Edward R. Dye
BY
Wood, Herron & Evans
ATTORNEYS.

June 7, 1955   E. R. DYE   2,709,810
SHOCK ABSORBING MEDIA
Filed Nov. 3, 1951   3 Sheets-Sheet 3

INVENTOR.
Edward R. Dye.
BY
Wood, Herron & Evans
ATTORNEYS.

United States Patent Office 2,709,810
Patented June 7, 1955

2,709,810

SHOCK ABSORBING MEDIA

Edward R. Dye, Buffalo, N. Y., assignor to Cornell Aeronautical Laboratory, Inc., Buffalo, N. Y., a corporation of New York Application November 3, 1951, Serial No. 254,756

10 Claims. (Cl. 2—3)

This invention relates to a new method of reinforcing or stiffening flexible sheet material, such as a plastic shell, against pressure or impact against one surface thereof, by means of reinforcing elements applied to the opposite surface, which reinforcing elements in and of themselves are softer and more flexible than the sheet material which is being reinforced. More particularly, this invention relates to a laminated construction hereinafter called a "beam pad" which is adapted to be used as an integral part of a device or appliance for protecting the human body from impact and concussion.

The term "beam pad" is chosen to describe the novel device of this invention because the device has the characteristics both of a beam and of a pad; one surface is hard, stiff and relatively inflexible so that the device functions as a beam in respect to blows directed against that surface, and the opposite surface is soft, flexible and cushion-like so that it functions as a pad in respect to pressure against that surface. The soft, flexible padding materials are combined in a manner whereby they rigidify the outer sheet material to which they are affixed so that a blow from the outside is not only cushioned on the inside but is distributed by the beam-like action of the pad over a substantial area, and the destructive force of the impact is thus dissipated.

For the purposes of this disclosure, the beam pad is illustrated as part of a football helmet. However, it is to be understood that the beam pad is equally well adapted for incorporation in other helmets, for example, those worn by aviators, the drivers of racing cars or speed boats, or others who are exposed to the danger of impact or blows which might be injurious to the skull. In addition, other protective devices, such as shoulder pads, hip and kidney pads, shin guards, or padding for any part of the body where there is the possibility of injury from a localized blow, may be constructed to embody the beam pad. The principle may also be employed for reinforcing sheet metal or plastic shells for any purpose whatsoever wherein is desirable that the reinforcing means be softer or less rigid than the shell itself.

The principles of the beam pad will be best understood as explained in relation to the accompanying drawings in which:

Figure 1 is a side elevational view of a lineal beam pad, representing diagrammatically the principles of this invention.

Figure 2 is a top plan view of the beam pad shown in Figure 1.

Figure 3 is a side elevational view of a football helmet incorporating a beam pad of this invention.

Figure 4 is a cross sectional view taken on the line 4—4 of Figure 3 showing in detail the installation of the beam pad in a football helmet.

Figure 5 is an enlarged, fragmentary cross sectional view taken on the line 5—5 in Figure 4.

Figure 6 is a view similar to Figure 4 showing an oval beam pad installed in a helmet.

Figure 7 is a view looking down upon a person wearing a helmet, with the helmet broken away to show a preferred form of strap suspension to be utilized in conjunction with the beam pad of this invention.

Figure 8 is a perspective view showing diagrammatically the component parts of the beam pad of this invention.

Figure 9:
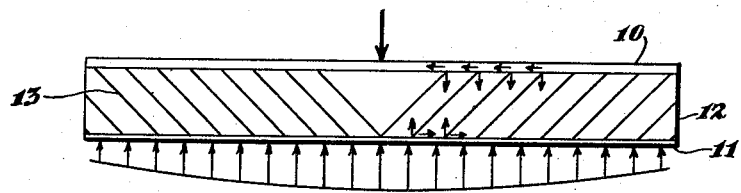
Figure 9 is a force diagram of a lineal beam pad similar to the one shown in Figure 1.

The configuration of the surface of the beam pad is not critical. This characteristic is an important feature of the invention, because it makes it possible to utilize the superior shock absorbing capacity of the beam pad in a wide variety of differently shaped devices. In a football helmet the pad may be oval, or if installed in sections, arcuate. Other protective devices, such as shin guards may utilize substantially straight pads. Regardless of its shape, the principles of the pad are the same, and thus in the drawings only a few forms are shown by way of example. Figures 1 and 2, for instance show a lineal beam pad, Figure 6, an oval one, and the remaining figures, except for Figures 9, 10 and 11, arcuate. The principles of the beam pad are best understood, however, by a consideration of the lineal form shown in Figures 1 and 2, and the diagram of Figure 9, and attention is now directed to these views.

In general, the lineal beam is constituted by a compression flange 10, a tension flange 11, a layer of padding or cushioning material 12 and flexible webbing or trussing 13. These elements together constitute an asymmetrically inflexible beam which has the essential softness of a pad on one side.

More particularly, the compression flange 10, in the instance shown, is constituted by a strip of plastic material which is of the weight and flexibility utilized for a football helmet. In this regard, the compression flange of Figures 1 and 2 is representative only. Installed in a protective device, this portion of the beam pad is constituted by the outer shell of the device. Generally speaking, materials for the compression flange, depending upon the use, may be tenite, Bakelite, methylmethacrylate, plastic reinforced with fiber glass, fiber board, wood, aluminum or aluminum alloys, steel or steel alloys, brass, bronze or copper or any relatively hard sheet material capable of withstanding compression, at least somewhat.

The tension flange 11, in the instance shown, is a strip of glass cloth which is substantially more flexible than the compression flange, but which cannot be stretched appreciably. In general, the materials for the tension flange, in addition to glass cloth, may be nylon cloth, canvas, duck, linen, muslin, wire cloth, strong cords or threads, or any flexible material capable of withstanding tensional forces without substantial stretch.

The padding 12, shown in the drawings, is a layer of sponge rubber. However, felt cotton, jute, plastic foams or any other resilient material which will yield easily under compressive forces may be used.

Figure 10:
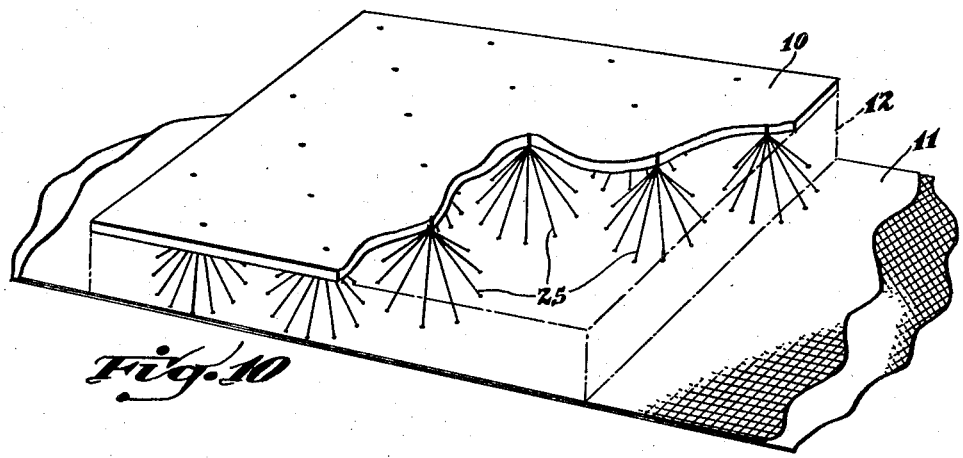
Figure 10 is a perspective view showing a modified form of beam pad.
Figure 11:
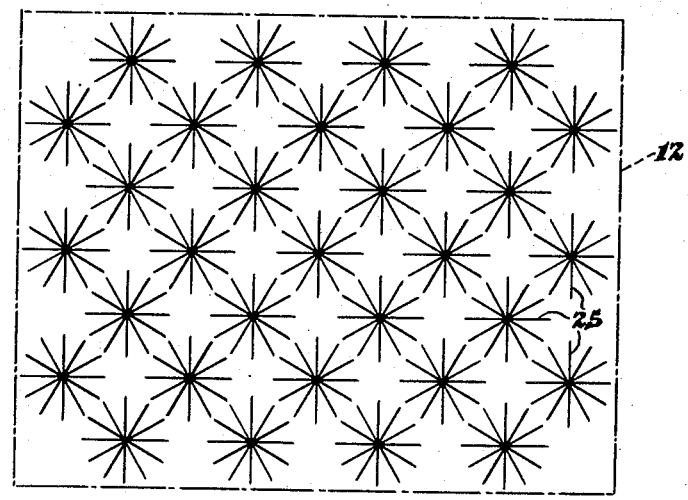
Figure 11 is a diagrammatic top plan view of the modification shown in Figure 10.

These three elements alone, as shown in the left hand portion of Figure 1, when fastened together interfacially, for instance by cement, constitute a beam, but a beam which is quite flexible in both directions, i. e., in respect to pressure from either side. Paradoxically, relative inflexibility in one direction is imparted to the beam constituted by these three elements by the mere addition of trussing or webbing 13 shown in the right hand portion of Figure 1 which is in and of itself quite flexible. This trussing connects the two flanges over the edges of the pad. In the example shown in Figures 1 and 2, the trussing comprises cloth cut on the bias so that each thread connects the flanges at an angle of approximately 45°. This trussing can also be accomplished by employing threads which extend in a diagonal direction through the padding 12 to tie together the compression flange 10 and tension flange 11. This form of trussing is shown in Figures 10 and 11 and is discussed in greater detail below. In general, the materials for the trussing, in addition to cloth, may be paper, cord or thread, paper and cloth combinations, metal mesh, thin sheets of plastic, aluminum or copper, or any material which will flex easily but which has tensional strength in the diagonal directions. The word "trussing," as used herein, is intended to indicate the type of interconnection provided by cross diagonal filaments, such as cloth cut on the bias, and substantial equivalents of the type indicated, which provide the same sort of diagonal mooring.

The angular relationship of the webbing and its effect are shown diagrammatically by dot-dash lines in Figure 1. These lines, it will be observed, are like the trussing of a structural metal beam and anchor the two flanges so that they cannot articulate lineally with respect to each other. Thus, if a compressional bending force is placed upon the compression flange side of the beam shown in Figure 1, it is offset by the tension forces developed in the webbing and transmitted to the tension flange. Since the tension flange is of a material which cannot stretch appreciably, it resists the bending force placed upon the compression flange, and thus, the whole beam is stiffened.

An analysis of these forces is shown in Figure 9. The blow's force is represented by the heavy arrow which is directed against the compression flange 10 and centered at the top of the view. The webbing 13 is represented by the lines which are disposed at 45° to the two flanges 10 and 11. The angular lines also represent the direction of the tensional forces placed upon the threads of the webbing. By resolving these angular tensional forces into their horizontal and vertical components, it will be seen that at the compression flange end of the threads of webbing 13, the pad takes the vertical forces and the compression flange takes the horizontal forces. At the tension flange side, the horizontal components are taken by the tension flange and the vertical components by the padding material. The net effect is that the tensioned threads of the webbing produce a lateral distribution of the compressive forces directly under a blow, so that the pressure distribution on the tension flange side 11 follows somewhat the pattern of the arrows at the lower portion of Figure 9. It can also be seen from this diagrammatic representation, that it is not necessary to fasten the padding material 13 to either the compression flange or the tension flange. Fastening, such as adhesive, is preferred, however, for convenience in holding the three components, the two flanges and the padding in position while the webbing is applied. The webbing, however, must be attached securely to the two flanges.

Although the flexible webbing does not add more than 1 per cent to the weight of the other three elements, it is found that the beam pad so constituted by its addition is stiffened in respect to blows directed against the compression flange side by more than 1000 per cent. The trussing, however, does not stiffen the beam pad in the same respect to blows directed against the tension flange side, due to the greater flexibility of the material on this side. The result is that the beam pad functions asymmetrically, and serves as a shock absorbing media in respect to blows against the compression flange 10 but as a cushion in respect to pressure against the tension flange 11.

Figures 3 through 8 inclusive of the drawings disclose the beam pad built into a football helmet. As disclosed in Figures 3, 4 and 5, two beam pads are employed which are arcuate in shape; one placed about the rim of the helmet to bear against the forehead of the wearer, the other against the back of the head of the wearer. As shown in Figure 3, the helmet 14 is an oval body which may be made of plastic and has a dome portion 15 and ear protecting lugs 16 which materially rigidify the sides of the helmet. These beam pads 17 are disposed about the rim of the helmet below the dome portion and above the ear protecting lugs. Between the front and rear beam pads are gaps, but these gaps do not seriously weaken the helmet because of the ear protecting lugs. Helmet tightening laces 18 are provided on each side, in the center of these gaps, and immediately over the ear protecting lugs. The tightening laces are optional, and it is not necessary to provide the gaps as disclosed.

In Figure 4, the helmet disclosed in Figure 3 is shown in section and in greater detail. As disclosed in this view, and also in Figure 6, a head band 19 which itself carries very thin soft padding 20 is disposed on the inside of the beam pad reinforcement so that a very soft surface is in immediate engagement with the head of the wearer. The tightening laces 18 (when used) pass through this head band 19 so that by tightening the laces, the helmet is distorted to more circular and less oval shape.

Figure 5 is a large sectional view which discloses the associations of the various elements previously enumerated. As previously indicated, Figure 6 shows an elliptical or oval beam pad which is alternative to the two arcuate beam pads.

As disclosed in Figure 7, the dome of the helmet is spaced from the head of the wearer by angulated straps 19 which constitute the subject matter of my co-pending application, Serial No. 254,757, filed November 3, 1951, now Patent No. 2,679,046, and form no part of this invention. The combination of the beam pads and the angulated straps, however, provides a helmet which affords remarkable protection in relation to the weight of the helmet.

Figure 8 illustrates in greater detail the preferred method of fabricating the preferred beam pad for the football safety helmet, and as disclosed in this figure, the flexible webbing 13 is constituted by three separate elements, an inner layer of cloth 21, an intermediate layer of paper 22, and an outer layer of cloth 23. Each of these layers is provided with notched marginal tabs 24 which facilitate attachment to a curved surface without overlap. These two layers of cloth are cut to fit over the cushioning material of the curved beam pad, that is, two curved strips of cloth are cut which are of the same size and shape. But when they are cut, they are so cut that when one is placed over the other, the threads of one piece are at an angle of 45° to the threads of the other piece. It follows that at any point on the curved beam pad there are threads extending between the flanges which are angulated so as to form trusses which anchor one flange to the other in a manner to retard lineal articulation of the flanges. If at any point on the curved beam pad, the threads of one strip of cloth extend directly between the two flanges, that is, on the shortest line, then the threads of the other layer of cloth will extend at 45°, and thus the threads of one or the other layers of cloth will connect the flanges on an angle, that is, on a line which is not the shortest distance between diagonally opposite points on the two flanges.

Although the beam pads are disclosed as lining the rim of the helmet in whole or in part, the beam pad type of reinforcement may be applied to the crown or dome of the helmet as well, and one or more beam pads may be utilized for this reinforcement. For a football helmet where lightness is of substantial importance and where the forces likely to be encountered are of limited magnitude, the utilization of the beam pad in the rim of the helmet suffices, but for crash helmets where blows of very great velocity and more force may be encountered, the beam pads in the crown are recommended.

In the embodiments of my invention discussed above, the beam pad shown is resistant to blows which tend to warp the plane of the compression flange in one direction only. Or putting it another way, the beam pad resists distorting forces which would tend to bend the compression flange toward a U-shape. In a narrow beam pad, the lack of resistance to bending in other directions is unimportant. However, where the pad is to be utilized to cover a large area, it becomes desirable to truss the pad so that it resists warping in all directions, i. e., against a force which would tend to indent the pad concavely. Preferred means for accomplishing the latter type stressing is illustrated in Figures 10 and 11. Here, threads pierce the pad 12, and instead of being woven into a fabric are arranged in pyramidal groups such as those shown at 25. These groups are distributed evenly throughout the pad, and each comprises a plurality of threads which are affixed to the compression flange 10 at a common point. The threads of each group extend from this point at 45° relative to the compression flange through the padding 12 and have their opposite ends affixed to the tension flange 11. The threads in each group preferably are evenly spaced with respect to one another and collectively define a right cone or pyramid.

In the light of the above discussion of the force diagram of Figure 9, it will be apparent that the use of groups of threads, such as those at 25, spreads the load from an impact force in all directions from the points of application of the force.

If desired, the tension flange in this embodiment may comprise two sheets of cloth cut on the bias and disposed relative to one another so that their respective threads cross at 45°. Closer association of the groups may be made than the one shown in these two figures by interweaving the threads of one group with the threads of another group.

It will be apparent that the principle of the reinforcing beam pads is not only applicable to many other devices for protecting the human body, but may also be employed for structural purposes. For instance, beam pads used for reinforcing the top of an automobile or other vehicle to supplement, or in place of, the rigid structural girders reduce the hazard to the passenger in case of collision or overturning. The principle may also be applied to a structure such as a boat hull under conditions where it may be advantageous to have the reinforcing ribs more flexible, instead of less flexible, than the shell itself. If, for instance, the outer shell were fabricated of plastic and stiffened by ribs which were in and of themselves more rigid than the plastic of the shell, then the less rigid shell would tend to disintegrate from concussion, particularly in the areas adjacent to the relatively rigid ribs, whereas, with the beam pad type of reinforcement, the reinforcing elements are more flexible, in and of themselves, than the shell itself, and the shell is itself stiffened, as distinguished from merely being backed up by more rigid elements.

In view of the wide variety of uses to which the beam pad principle is adapted, the beam pad invention may be best regarded as a method of reinforcing a semi-flexible shell structure by means of rigidifying elements which are in and of themselves both softer and less rigid than the shell which is being reinforced.

Having described my invention, I desire to be limited only by the following claims.

I claim:

1. A padded safety helmet comprising, a shell adapted to fit over the head of the wearer and constitute both the exterior of the helmet and the compression flange of one or more beam pads which are located within said outer shell to cushion the head of the wearer of the helmet, each beam pad comprising a layer of padding material interfacially associated with a portion of the outer shell, a tension flange of material more flexible than that of the shell, but not lineally elastic, interfacially associated with the layer of padding on the side opposite the shell, webbing constituted by crossed diagonal filaments connecting the edges of the tension flange with the edges of that portion of the outer shell with which the padding material is associated, whereby lineal articulation of the tension flange in relation to the shell is substantially inhibited by the webbing.

2. A beam pad comprising a layer of cushioning material, a semi-rigid plastic compression flange interfacially secured to said cushioning material, a tension flange of flexible, but non-elastic, material interfacially secured to the opposite face of the cushioning material, and a plurality of flexible webs constituted by crossed diagonal filaments extending between the compression flange and the tension flange to truss the flanges into nonarticulating lineal relationship.

3. A padded safety helmet comprising a plastic shell adapted to fit over the head of the wearer and constitute both the exterior of the helmet and the compression flange of one or more beam pads which are located about the rim of said outer shell to cushion the head of the wearer of the helmet, each beam pad comprising a layer of padding material interfacially secured to the inner face of the shell, a tension flange constituted by a strip of glass cloth interfacially secured to the inner face of the layer of padding, and flexible but diagonally non-stretchable webbing connecting the edges of the tension flange and the outer shell with the webbing arranged to inhibit lineal articulation of the tension flange with respect to the shell.

4. A beam pad comprising a sheet of semi-rigid material, a sheet of flexible but substantially non-stretchable material, a layer of cushioning material sandwiched between said sheets, and flexible but substantially non-stretchable cross threads connecting said sheets diagonally in relation to the longitudinal extent of said sheets to prevent relative lineal articulation of the one in respect to the other.

5. A beam pad comprising a sheet of semi-rigid material, a sheet of flexible but substantially non-stretchable material, a layer of resilient material sandwiched between said sheets, and groups of threads interconnecting said sheets, the threads of each group disposed in non-parallel relationship with respect to each other.

6. Means for rigidifying a sheet of semi-rigid material comprising a strip of flexible but substantially non-stretchable material, a layer of resilient material sandwiched between said sheet and said strip, said sheet and said strip interconnected by webs of flexible but diagonally non-stretchable material disposed at the respective sides of said layer of resilient material.

7. Means for rigidifying semi-rigid sheet material comprising a sheet of flexible but substantially non-stretchable material, a layer of cushioning material sandwiched between the respective sheet materials, and substantially non-stretchable but flexible threads joining the respective sheet materials diagonally in respect to their longitudinal extent to inhibit lineal articulation of the sheet of flexible but substantially non-stretchable material with respect to the semi-rigid sheet.

8. A helmet comprising a shell of semi-rigid material, a sheet of flexible but substantially non-stretchable material, a layer of resilient material sandwiched between said sheet and said shell at the inner side thereof, and said sheet and said shell interconnected by flexible but diagonally non-stretchable means arranged to inhibit articulation of the sheet of flexible but substantially non-stretchable material with respect to said shell.

9. A beam pad comprising a layer of cushioning material, a semi-rigid compression flange disposed against one side of said cushioning material, a tension flange of flexible, but unelastic, material disposed at the opposite side of the cushioning material, and a plurality of flexible webs extending between the compression flange and the tension flange, the elements constituting said webs being disposed diagonally in respect to the longitudinal dimension of each flange, thereby trussing the said flanges into non-articulating longitudinal relationship.

10. A beam pad comprising a sheet of semi-rigid plastic material, a strip of glass cloth, a layer of sponge rubber sandwiched between said sheet and said strip, and flexible but substantially non-stretchable cloth material interconnecting the sheet and strip at both sides of the layer of sponge rubber, said cloth material being disposed with the threads therein angulated with respect to the longitudinal extent of the sides of said sheet and strip.

References Cited in the file of this patent

UNITED STATES PATENTS

| | | |
|---|---|---|
| 1,842,953 | Turner | Jan. 26, 1932 |
| 2,550,044 | Delsalle | Apr. 24, 1951 |